United States Patent
Durbin et al.

(10) Patent No.: US 7,520,134 B2
(45) Date of Patent: Apr. 21, 2009

(54) METHODS AND APPARATUS FOR INJECTING FLUIDS INTO A TURBINE ENGINE

(75) Inventors: Mark D. Durbin, Springboro, OH (US); Allen Michael Danis, Mason, OH (US); Timothy James Held, Blanchester, OH (US); Daniel Durstock, Fort Wright, KY (US); James N. Cooper, Hamilton, OH (US); Douglas Marti Fortuna, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 11/537,066

(22) Filed: Sep. 29, 2006

(65) Prior Publication Data

US 2008/0078180 A1 Apr. 3, 2008

(51) Int. Cl.
*F02C 1/00* (2006.01)
(52) U.S. Cl. .............................. 60/742; 60/740; 60/746; 60/804
(58) Field of Classification Search .................. 60/746, 60/748, 776, 804, 740, 742
See application file for complete search history.

(56) References Cited

U.S. PATENT DOCUMENTS

| | | | |
|---|---|---|---|
| 1,589,704 A * | 6/1926 | Kenworthy | ................. 239/430 |
| 4,631,914 A | 12/1986 | Hines | |
| 4,660,376 A | 4/1987 | Johnson | |
| 5,743,080 A | 4/1998 | Ginter | |
| 6,434,945 B1 * | 8/2002 | Mandai et al. | ................. 60/740 |
| 6,883,329 B1 | 4/2005 | Martling | |
| 6,935,117 B2 * | 8/2005 | Cowan | ........................ 60/742 |
| 6,962,055 B2 | 11/2005 | Chen et al. | |
| 6,983,605 B1 | 1/2006 | Hook et al. | |
| 7,082,765 B2 | 8/2006 | Fortuna et al. | |
| 7,104,069 B2 * | 9/2006 | Martling et al. | ............... 60/775 |
| 2003/0014978 A1 | 1/2003 | Horii et al. | |
| 2004/0035114 A1 * | 2/2004 | Hayashi et al. | ............... 60/737 |
| 2004/0177618 A1 | 9/2004 | Placko et al. | |
| 2004/0255596 A1 | 12/2004 | Horii et al. | |
| 2006/0218931 A1 | 10/2006 | Haertel et al. | |
| 2007/0044477 A1 * | 3/2007 | Held et al. | ..................... 60/776 |

* cited by examiner

*Primary Examiner*—Michael Cuff
*Assistant Examiner*—Phutthiwat Wongwian
(74) *Attorney, Agent, or Firm*—William Scott Andes, Esq.; Armstrong Teasdale LLP

(57) ABSTRACT

A method of operating a gas turbine engine is provided. The method includes discharging pilot fuel into a combustion chamber from a nozzle through at least one pilot fuel outlet defined in a tip of the nozzle, discharging steam from the nozzle through a plurality of steam outlets that are spaced circumferentially about the plurality of pilot fuel outlets, and discharging primary fuel from the nozzle through a plurality of primary fuel outlets that are circumferentially aligned with the plurality of steam outlets. To facilitate mixing the primary fuel with the steam, the primary fuel is discharged from the nozzle tip at an oblique angle with respect to a centerline extending through the nozzle tip.

20 Claims, 5 Drawing Sheets

METHODS AND APPARATUS FOR INJECTING FLUIDS INTO A TURBINE ENGINE

BACKGROUND OF THE INVENTION

This application relates generally to gas turbine engines and, more particularly, to methods and apparatus for injecting fluids into turbine engines.

Air pollution concerns worldwide have led to stricter emissions standards both domestically and internationally. These same standards have caused turbine engine manufacturers to design more efficient engines, as well as design improved retrofit components that enable engines to operate more efficiently, with improved emissions, and/or with extended useful life and reliability. Moreover, the generally high capital costs associated with the purchase and maintenance of turbine engines, such as revenue losses generated during engine outages, have caused the same engine manufacturers to attempt to design engines that are more reliable and that have extended useful life.

Controlling the mixture of fluids, i.e. gas and steam, delivered to a gas turbine engine may be critical to the engine's performance and/or emissions. At least some known gas turbine engines operating with gas and steam do not meet emissions requirements at all operating conditions, and in particular, such engines generally do not satisfy carbon monoxide (CO) emission requirements as well as other known engines. For example, at least some known dual fuel gas turbine engines utilizing gas and steam generate higher CO emissions than dual fuel gas turbine engines utilizing gas and water. More specifically, poor mixing of the gas and steam may cause fuel to remain towards a centerline of the nozzle, leading to higher CO emissions being generated. Moreover, the axial, non-swirled injection of the gas and steam may cause the recirculation stability zone within the combustor to be shifted downstream, which may cause the flame to become detached, resulting in the generation of CO emissions.

BRIEF DESCRIPTION OF THE INVENTION

In one aspect, a method of operating a gas turbine engine is provided. The method includes discharging pilot fuel into a combustion chamber from a nozzle through at least one pilot fuel outlet defined in a tip of the nozzle, discharging steam from the nozzle through a plurality of steam outlets that are spaced circumferentially about the plurality of pilot fuel outlets, and discharging primary fuel from the nozzle through a plurality of primary fuel outlets that are circumferentially aligned with the plurality of steam outlets. To facilitate mixing the primary fuel with the steam, the primary fuel is discharged from the nozzle tip at an oblique angle with respect to a centerline extending through the nozzle tip.

In another aspect, a nozzle tip for a turbine engine fuel nozzle is provided. The nozzle tip includes an annular body having a centerline extending there through. The annular body includes at least one pilot fuel outlet configured to discharge only pilot fuel from the nozzle tip, and a plurality of steam outlets configured to discharge steam from the nozzle tip. The plurality of steam outlets are spaced circumferentially about the at least one pilot fuel outlet. The annular body also includes a plurality of primary fuel outlets configured to discharge primary fuel from the nozzle tip. The plurality of primary fuel outlets are circumferentially aligned with the plurality of steam outlets. The plurality of primary fuel outlets are configured to discharge primary fuel at an oblique angle with respect to the centerline to facilitate mixing the primary fuel with the steam.

In a further aspect, a gas turbine engine is provided. The gas turbine engine includes a combustor and a fuel nozzle for injecting fluids into the combustor. The nozzle includes a nozzle tip comprising an annular body having a centerline. The nozzle tip is in flow communication with the combustor. The nozzle tip also includes at least one pilot fuel outlet configured to discharge only pilot fuel from the nozzle tip, and a plurality of steam outlets configured to discharge steam from the nozzle tip. The plurality of steam outlets are spaced circumferentially about the at least one pilot fuel outlet. The nozzle tip also includes a plurality of primary fuel outlets configured to discharge primary fuel from the nozzle tip. The plurality of primary fuel outlets are circumferentially aligned with the plurality of steam outlets. The plurality of primary fuel outlets are configured to discharge primary fuel at an oblique angle with respect to the centerline to facilitate mixing the primary fuel with the steam.

DETAILED DESCRIPTION OF THE INVENTION

Figure 1:
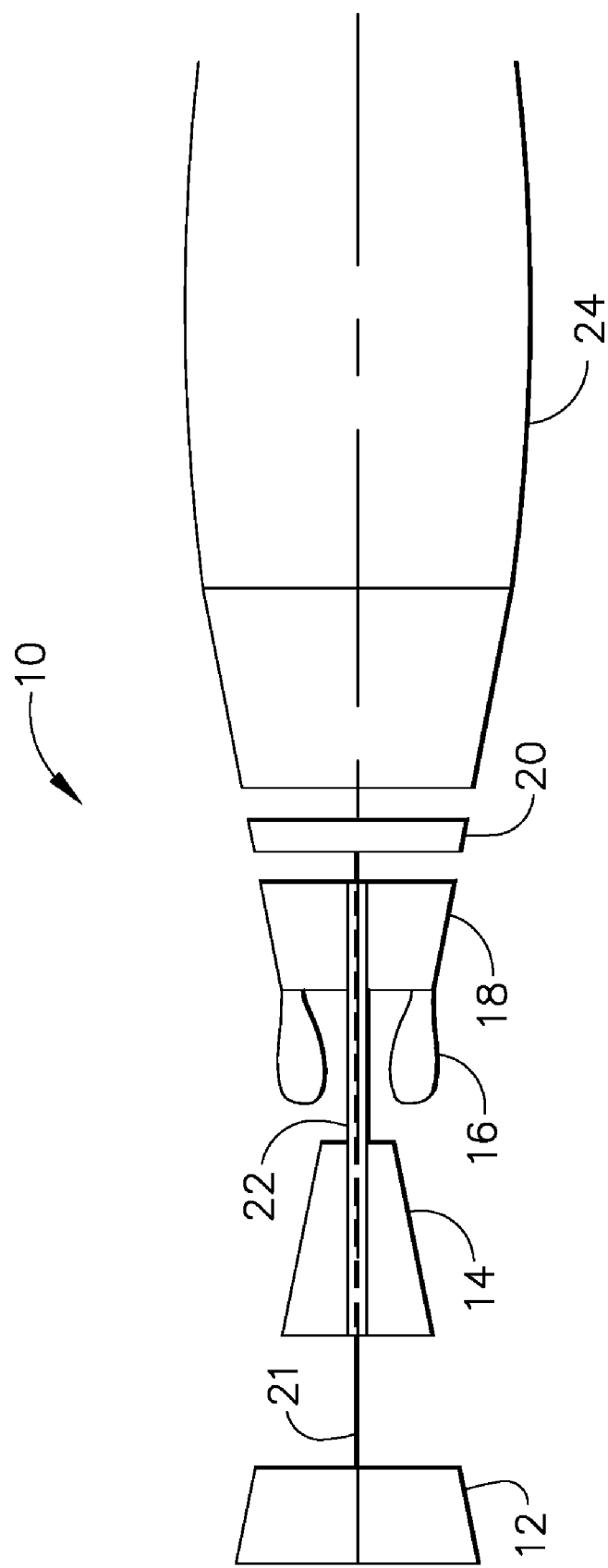
FIG. 1 is a schematic illustration of an exemplary gas turbine engine.

FIG. 1 is a schematic illustration of an exemplary gas turbine engine 10. Engine 10 includes a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 21, and compressor 14 and turbine 18 are coupled by a second shaft 22.

In operation, air flows through low pressure compressor 12 supplying compressed air from low pressure compressor 12 to high pressure compressor 14. The highly compressed air is delivered to combustor 16. Airflow from combustor 16 is channeled through a turbine nozzle to drive turbines 18 and 20, prior to exiting gas turbine engine 10 through an exhaust nozzle 24. As is known in the art, gas turbine engines further include fuel nozzles (not shown) which supply fuel to the combustor 16.

Figure 2:
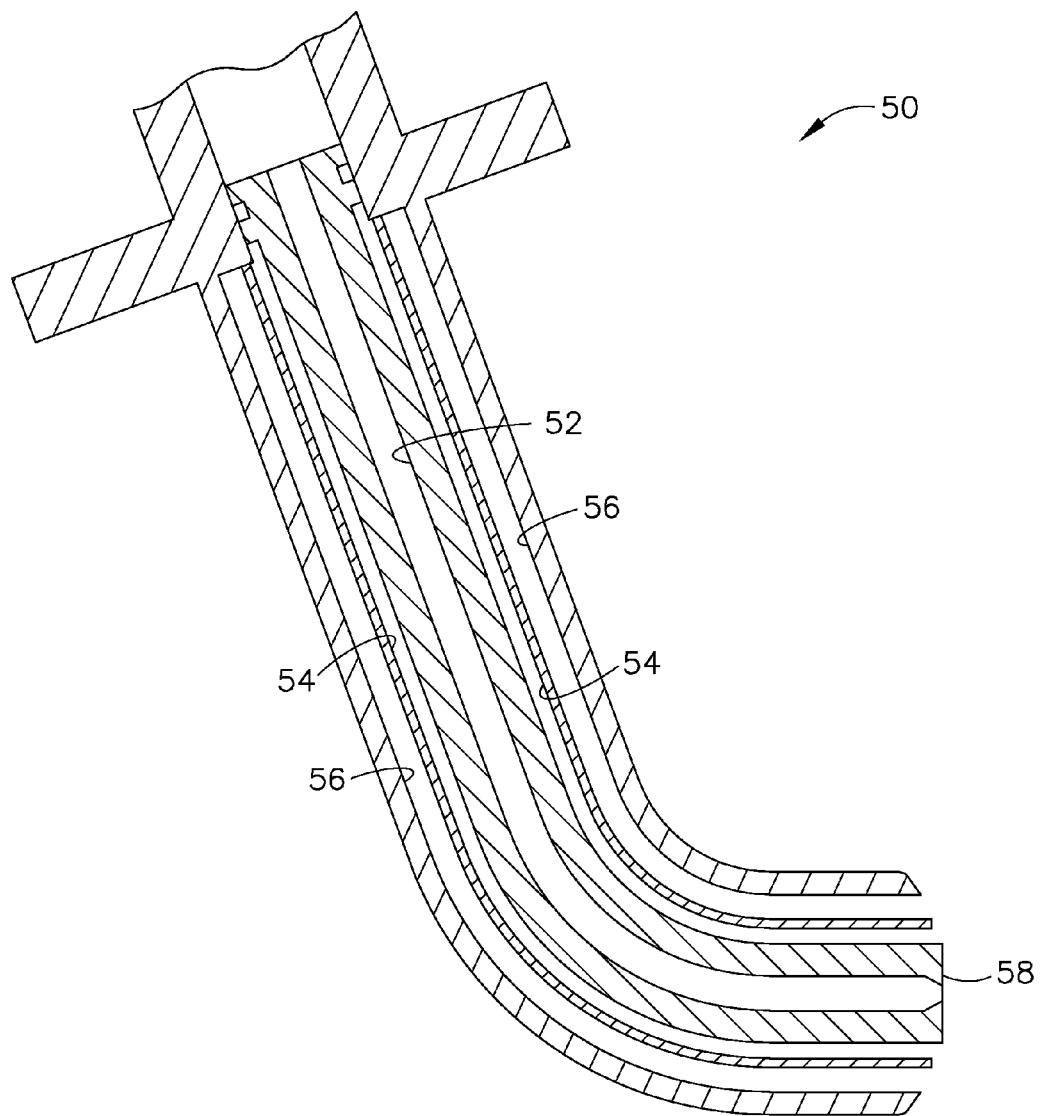
FIG. 2 is a side schematic cross-sectional view of an exemplary embodiment of a fuel nozzle that may be used with the gas turbine engine shown in FIG. 1.

FIG. 2 is a side schematic cross-sectional view of an exemplary embodiment of a fuel nozzle 50 that may be used with gas turbine engine 10. Fuel nozzle 50 includes a pilot fuel circuit 52, a primary fuel circuit 54, and a steam circuit 56. Pilot fuel circuit 52 delivers pilot fuel through the center of nozzle 50 to the end 58 of nozzle 50 during start-up and idle operations. End 58 is configured to discharge pilot fuel into the combustor 16 (shown in FIG. 1) of gas turbine engine 10. Primary fuel circuit 54 and steam circuit 56 are positioned radially outward from, and circumferentially around, pilot fuel circuit 52. Primary fuel circuit 54 and steam circuit 56 deliver primary fuel and steam, respectively, to combustor 16 through nozzle end 58. More specifically, primary fuel and steam are each discharged through nozzle end 58 into a combustion zone defined downstream from nozzle 50 within combustor 16.

Figure 3:
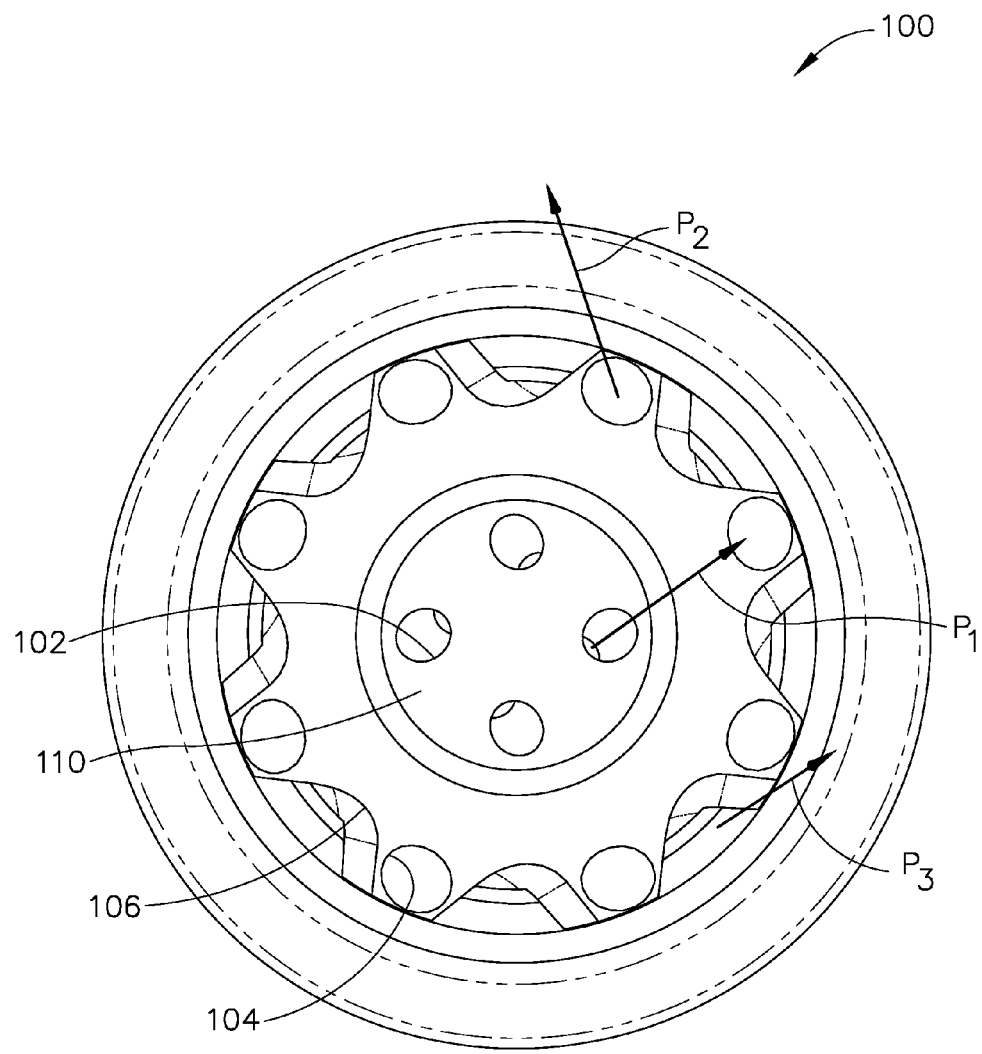
FIG. 3 is a front view of an exemplary fuel nozzle tip that may be used with the engine shown in FIG. 1.
Figure 4:
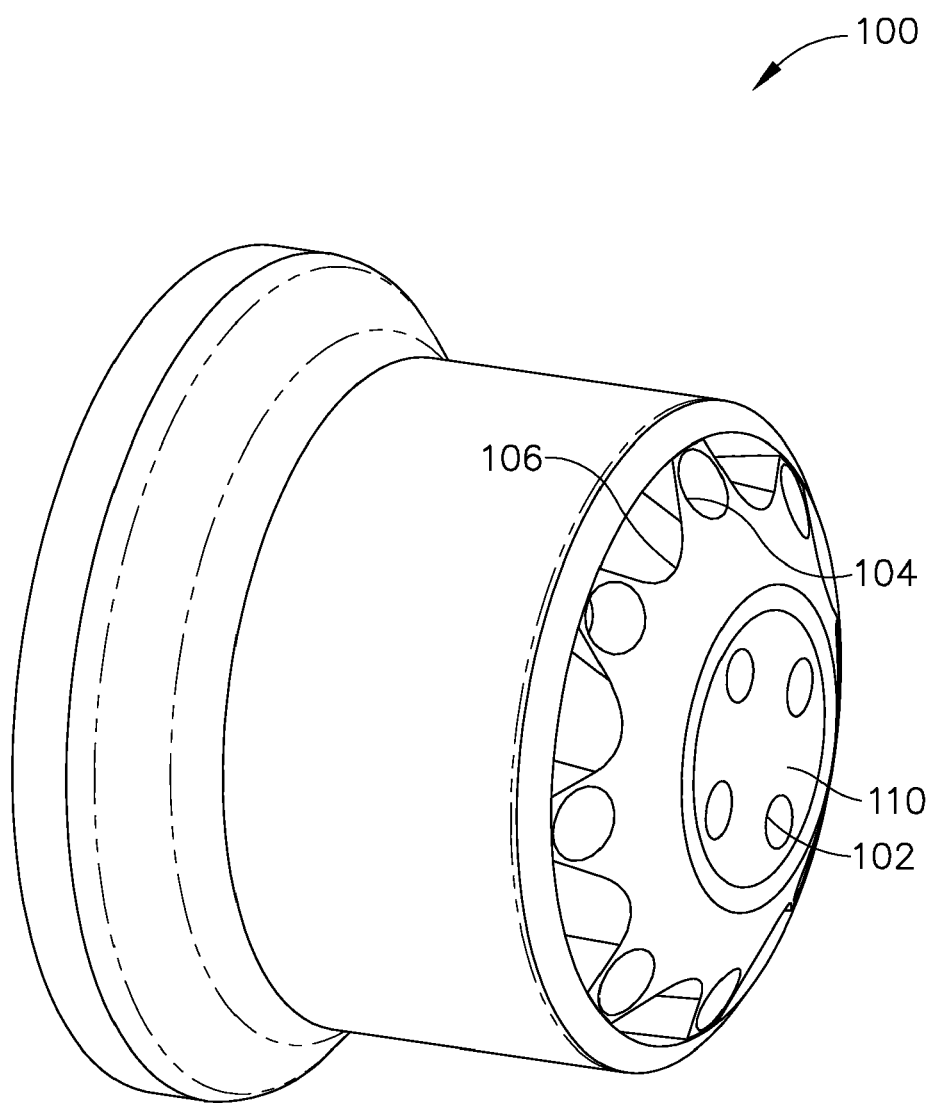
FIG. 4 is a perspective view of the nozzle tip shown in FIG. 3.
Figure 5:
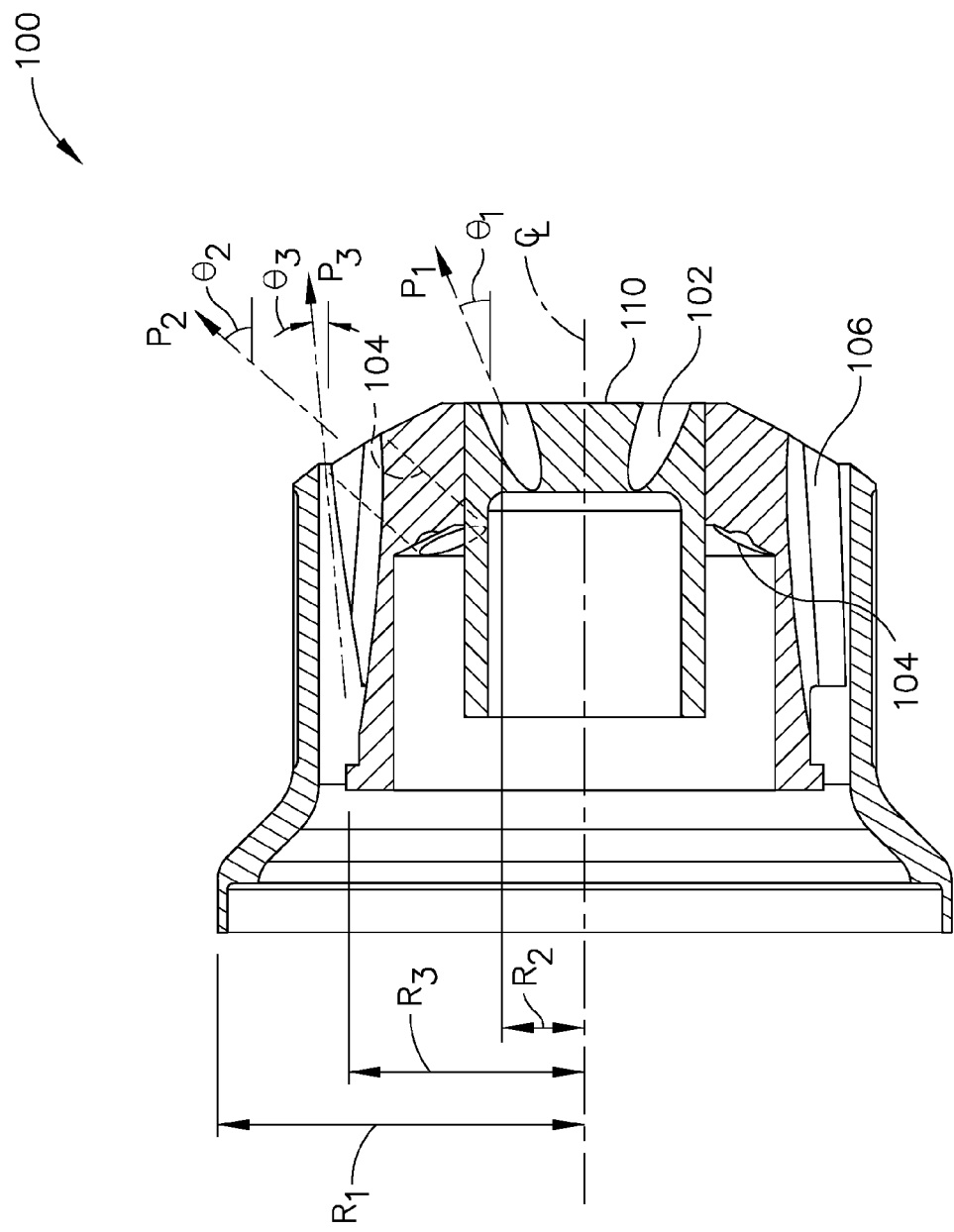
FIG. 5 is a cross-sectional view of the fuel nozzle tip shown in FIG. 3.

FIG. 3 is a front view of an exemplary fuel nozzle tip 100 that may be used with fuel nozzle 50 to inject fluids into gas turbine engine 10; FIG. 4 is a perspective view of fuel nozzle tip 100; and FIG. 5 is a cross-sectional view of fuel nozzle tip 100. In the exemplary embodiment, nozzle tip 100 includes a centerline $C_L$ extending through nozzle tip 100 and an outer radius $R_1$ measured from centerline $C_L$. Moreover, in the exemplary embodiment, fuel nozzle tip 100 also includes a plurality of pilot fuel outlets 102, a plurality of primary fuel outlets 104, and a plurality of steam outlets 106. Pilot fuel outlets 102 are spaced circumferentially about, and radially outward from, a center 110 of fuel nozzle tip 100. More specifically, pilot fuel outlets 102 are spaced circumferentially about nozzle tip 100 at a radial distance $R_2$ measured from centerline $C_L$.

Pilot fuel outlets 102 are each oriented obliquely with respect to centerline $C_L$, such that pilot fuel discharged from outlets 102 is expelled outward from tip 100 at an oblique angle $\theta_1$ with respect to centerline $C_L$ along a discharge path $P_1$. In one embodiment, angle $\theta_1$ is approximately fifteen degrees. In the exemplary embodiment, nozzle tip 100 includes four pilot fuel outlets 102. In alternative embodiments, nozzle tip 100 includes more or less then four pilot fuel outlets 102. As will be appreciated by one of ordinary skill in the art, the number of pilot fuel outlets 102 and discharge angle $\theta_1$ vary depending on the application of fuel nozzle tip 100.

Primary fuel outlets 104 and steam outlets 106 are spaced circumferentially around, and radially outward from, pilot fuel outlets 102. Specifically, primary fuel outlets 104 and steam outlets 106 are spaced a radial distance $R_3$ measured from centerline $C_L$. In the exemplary embodiment, radial distance $R_3$ is greater than radial distance $R_2$. Primary fuel outlets 104 and steam outlets 106 are oriented such that each primary fuel outlet 104 is positioned between a circumferentially adjacent pair of steam outlets 106. Accordingly, outlets 104 and 106 are circumferentially aligned relative to each other. As will be appreciated by one of ordinary skill in the art, the number of primary fuel outlets 104 and the number of steam outlets 106 varies depending on the application of fuel nozzle tip 100.

In the exemplary embodiment, primary fuel outlets 104 are oriented obliquely with respect to centerline $C_L$. As such, primary fuel discharged from outlets 104 is expelled outward from tip 100 at an oblique angle $\theta_2$ with respect to centerline $C_L$ along a discharge path $P_2$ and towards steam outlets 106. In one embodiment, angle $\theta_2$ is approximately fifteen degrees; however, angle $\theta_2$ may be any angle suitable for functioning as described herein. Further, in the exemplary embodiment, steam outlets 106 are also oriented obliquely with respect to centerline $C_L$. As such, steam discharged from outlets 106 is expelled circumferentially outward from tip 100 at an oblique angle $\theta_3$ with respect to centerline $C_L$ along a discharge path $P_3$ and towards primary fuel outlets 104. In one embodiment, angle $\theta_3$ is approximately fifteen degrees; however, angle $\theta_3$ may be any angle suitable for functioning as described herein. Accordingly, steam discharged from steam outlets 106 and primary fuel discharged from primary fuel outlets 104 are facilitated to be mixed and swirled together upon discharge from nozzle tip 100.

During operation, pilot outlets 102 discharge pilot fuel into combustor 16 during start up, or idle, operations of gas turbine engine 10. When additional power is demanded, primary fuel outlets 104 and steam outlets 106 discharge both primary fuel and steam, respectively, into a combustion zone defined in combustor 16. More specifically, primary fuel and steam are discharged from fuel nozzle tip 100 at discharge angles $\theta_2$ and $\theta_3$, respectively, such that swirling and mixing of primary fuel and steam is enhanced as the constituents are discharged from nozzle tip 100. Further, an overall swirl strength is increased to facilitate drawing a recirculation zone generated downstream from nozzle tip 100 closer towards the nozzle tip center 110.

As such, the improved mixing of gas and steam facilitates combustor 16 generating lower emissions without limiting its capability of meeting domestic and international emissions standards. Specifically, the fuel steam mixture exiting nozzle tip 100 provides a more uniform fuel distribution, such that a more stable, lower emissions flame can occur, thereby facilitating reducing the levels of carbon monoxide emitted from turbine engine 10.

In one embodiment, a method of operating a gas turbine engine is provided. The method includes discharging pilot fuel into a combustion chamber from a nozzle through at least one pilot fuel outlet defined in a tip of the nozzle, discharging steam from the nozzle through a plurality of steam outlets that are spaced circumferentially about the plurality of pilot fuel outlets, and discharging primary fuel from the nozzle through a plurality of primary fuel outlets that are circumferentially aligned with the plurality of steam outlets. To facilitate mixing the primary fuel with the steam, the primary fuel is discharged from the nozzle tip at an oblique angle with respect to a centerline extending through the nozzle tip.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

The above-described fuel nozzle tip for a gas turbine engine facilitates providing an engine that is capable of meeting emissions standards. The fuel nozzle tip includes circumferentially-spaced primary fuel outlets and steam outlets that discharge primary fuel and steam there from at angles that facilitate improved swirling and mixing of steam and fuel. As a result, the recirculation zone is generated closer to the center of the combustor such that a more stable flame can occur and such that lower emissions are generated. As such, the above-described nozzle tip facilitates enhanced steam and fuel mixing, and reduced carbon monoxide emissions in a cost effective and reliable manner.

Although the methods and systems described herein are described in the context of supplying fuel to a gas turbine engine, it is understood that the fuel nozzle tip methods and systems described herein are not limited to gas turbine engines. Likewise, the fuel nozzle tip components illustrated are not limited to the specific embodiments described herein, but rather, components of the fuel nozzle tip can be utilized independently and separately from other components described herein.

While the invention has been described in terms of various specific embodiments, those skilled in the art will recognize that the invention can be practiced with modification within the spirit and scope of the claims.

What is claimed is:

1. A method of operating a gas turbine engine, said method comprising: discharging pilot fuel into a combustion chamber from a nozzle through at least one pilot fuel outlet defined in a tip of the nozzle; discharging steam from the nozzle through a plurality of steam outlets that are spaced circumferentially about the at least one pilot fuel outlet; discharging primary fuel from the nozzle through a plurality of primary fuel outlets that are circumferentially aligned with the plurality of steam outlets, wherein to facilitate mixing the primary fuel with the steam, the primary fuel is discharged from the nozzle tip at a first oblique angle with respect to a centerline extending through the nozzle tip.

2. A method as recited in claim 1 further comprising discharging the primary fuel from the nozzle tip at a discharge angle of approximately fifteen degrees measured with respect to the centerline.

3. A method as recited with claim 1 further comprising discharging the steam from the nozzle tip at a second oblique angle with respect to the centerline to facilitate mixing the primary fuel and the steam.

4. A method as recited with claim 3 further comprising discharging the steam from the nozzle tip at a discharge angle of approximately fifteen degrees with respect to the centerline.

5. A method as recited with claim 1 further comprising discharging the pilot fuel from the nozzle tip at a third oblique angle with respect to the centerline.

6. A method as recited in claim 5 further comprising discharging the pilot fuel from the nozzle tip at a discharge angle of approximately fifteen degrees with respect to the centerline.

7. A method as recited in claim 1 further comprising:
discharging pilot fuel from the nozzle tip at a first radial distance measured from the centerline; and
discharging steam and primary fuel from the nozzle tip at a second radial distance that is longer than the first radial distance.

8. A nozzle tip for a turbine engine fuel nozzle, said nozzle tip comprising:
an annular body having a centerline extending therethrough, said annular body comprising:
at least one pilot fuel outlet configured to discharge only pilot fuel from said nozzle tip;
a plurality of steam outlets configured to discharge steam from said nozzle tip, said plurality of steam outlets spaced circumferentially about said at least one pilot fuel outlet; and
a plurality of primary fuel outlets configured to discharge primary fuel from said nozzle tip, said plurality of primary fuel outlets circumferentially aligned with said plurality of steam outlets, said plurality of primary fuel outlets configured to discharge primary fuel at a first oblique angle with respect to the centerline to facilitate mixing the primary fuel with the steam.

9. A nozzle tip as recited in claim 8 wherein said plurality of primary fuel outlets are configured to discharge the primary fuel from said nozzle tip at a discharge angle of approximately fifteen degrees with respect to the centerline.

10. A nozzle tip as recited in claim 8 wherein said plurality of steam outlets are configured to discharge steam at a second oblique angle with respect to the centerline to facilitate swirling the primary fuel and the steam.

11. A nozzle tip as recited in claim 10 wherein said plurality of steam outlets are configured to discharge steam at a discharge angle of approximately fifteen degrees with respect to the centerline.

12. A nozzle tip as recited in claim 8 wherein said at least one pilot fuel outlet is configured to discharge pilot fuel from said nozzle tip at a third oblique angle with respect to the centerline.

13. A nozzle tip as recited in claim 12 wherein said at least one pilot fuel outlet is configured to discharge pilot fuel at a discharge angle of approximately fifteen degrees with respect to the centerline.

14. A nozzle tip as recited in claim 8 wherein said at least one pilot fuel outlet is positioned at a first radial distance measured from the centerline and said plurality of steam and primary fuel outlets are positioned at a second radial distance measured from the centerline that is longer than the first radial distance.

15. A gas turbine engine comprising:
a combustor; and
a fuel nozzle for injecting fluids into said combustor, said nozzle comprising:
a nozzle tip comprising an annular body having a centerline, said nozzle tip in flow communication with said combustor, said nozzle tip further comprising:
at least one pilot fuel outlet configured to discharge only pilot fuel from said nozzle tip;
a plurality of steam outlets configured to discharge steam from said nozzle tip, said plurality of steam outlets spaced circumferentially about said at least one pilot fuel outlet; and
a plurality of primary fuel outlets configured to discharge primary fuel from said nozzle tip, said plurality of primary fuel outlets circumferentially aligned with said plurality of steam outlets, said plurality of primary fuel outlets configured to discharge primary fuel at a first oblique angle with respect to the centerline to facilitate mixing the primary fuel with the steam.

16. A gas turbine engine as recited in claim 15 wherein said plurality of primary fuel outlets are configured to discharge the primary fuel from said nozzle tip at a discharge angle of approximately fifteen degrees with respect to the centerline.

17. A gas turbine engine as recited in claim 15 wherein said plurality of steam outlets are configured to discharge steam at a second oblique angle with respect to the centerline to facilitate swirling the primary fuel and the steam.

18. A nozzle tip as recited in claim 17 wherein said plurality of steam outlets are configured to discharge steam at a discharge angle of approximately fifteen degrees with respect to the centerline.

19. A nozzle tip as recited in claim 15 wherein said at least one pilot fuel outlet is configured to discharge pilot fuel from said nozzle tip at a third oblique angle with respect to the centerline.

20. A nozzle tip as recited in claim 15 wherein said at least one pilot fuel outlet is positioned at a first radial distance measured from the centerline and said plurality of steam and primary fuel outlets are positioned at a second radial distance measured from the centerline that is longer than the first radial distance.

* * * * *